United States Patent
Braunmueller et al.

(10) Patent No.: US 10,501,934 B2
(45) Date of Patent: Dec. 10, 2019

(54) METHOD AND APPARATUS FOR PRODUCING A UNIVERSAL PROFILE ELEMENT

(71) Applicant: HILTI AKTIENGESELLSCHAFT, Schaan (LI)

(72) Inventors: Walter Braunmueller, Kaufering (DE); Manfred Klein, Kaufering (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 231 days.

(21) Appl. No.: 15/550,629

(22) PCT Filed: Feb. 12, 2016

(86) PCT No.: PCT/EP2016/053019
§ 371 (c)(1),
(2) Date: Aug. 11, 2017

(87) PCT Pub. No.: WO2016/128553
PCT Pub. Date: Aug. 18, 2016

(65) Prior Publication Data
US 2018/0038100 A1    Feb. 8, 2018

(30) Foreign Application Priority Data

Feb. 13, 2015  (EP) ..................................... 15155100
Feb. 13, 2015  (EP) ..................................... 15155101
(Continued)

(51) Int. Cl.
*B29C 44/32*    (2006.01)
*E04B 2/82*     (2006.01)
(Continued)

(52) U.S. Cl.
CPC .............. *E04B 2/82* (2013.01); *B29C 44/324* (2013.01); *E04B 1/68* (2013.01); *E04B 1/82* (2013.01);
(Continued)

(58) Field of Classification Search
None
See application file for complete search history.

(56) References Cited

U.S. PATENT DOCUMENTS 2,560,308 A * 7/1951 Spraragen ............. E06B 7/2312
49/495.1
2,898,626 A * 8/1959 Alderfer ................ B29C 44/321
156/203
(Continued)

FOREIGN PATENT DOCUMENTS

DE   40 06 997 A1   9/1991
EP    1 389 629 A1   2/2004
(Continued)

OTHER PUBLICATIONS

Machine translation French Patent 2787825, date unknown.*
International Search Report dated May 25, 2016, in PCT/EP2016/053019 filed Feb. 12, 2016.

*Primary Examiner* — Jeffry H Aftergut
(74) *Attorney, Agent, or Firm* — Grüneberg and Myers PLLC (57) ABSTRACT

A method for producing a profile element for sealing building joints, particularly for sealing them with regard to noise and smoke and, if applicable, with regard to fire is described, as is an apparatus for producing such a profile element, as well as use of the profile element produced according to the invention for acoustical, smoke-proof and/or fire-proof sealing of connection joints in drywall walls, above all of expansion joints. In particular, an improved method for
(Continued)

continuous and endless production of a universal profile element for different profile dimensions is described.

18 Claims, 3 Drawing Sheets

(30) Foreign Application Priority Data

| | | |
|---|---|---|
| Feb. 13, 2015 | (EP) | 15155102 |
| Feb. 13, 2015 | (EP) | 15155103 |
| May 11, 2015 | (EP) | 15167086 |

(51) Int. Cl.
*E04B 2/74* (2006.01)
*E04B 1/68* (2006.01)
*E04B 1/82* (2006.01)
*E04B 1/94* (2006.01)
*B29L 31/26* (2006.01)
*B29K 75/00* (2006.01)

(52) U.S. Cl.
CPC ............ *E04B 1/948* (2013.01); *E04B 2/7411* (2013.01); *E04B 2/7457* (2013.01); *B29K 2075/00* (2013.01); *B29L 2031/26* (2013.01)

(56) References Cited

U.S. PATENT DOCUMENTS

| | | | | |
|---|---|---|---|---|
| 2,898,634 | A * | 8/1959 | Alderfer | B29C 66/91935 264/46.6 |
| 3,634,565 | A | 1/1972 | Schaerer | |
| 4,082,824 | A * | 4/1978 | Del Carpio | B29C 44/30 264/46.3 |
| 4,529,742 | A * | 7/1985 | von Bonin | C08G 18/3851 521/107 |
| 2004/0144036 | A1* | 7/2004 | Heyden | B60J 10/35 49/498.1 |
| 2006/0093773 | A1 | 5/2006 | Dujardin et al. | |
| 2009/0107623 | A1 | 4/2009 | Davidson et al. | |
| 2012/0029103 | A1* | 2/2012 | Rodrigo | C08G 18/10 521/106 |
| 2012/0261053 | A1* | 10/2012 | O'Leary | B29C 44/185 156/79 |

FOREIGN PATENT DOCUMENTS

| | | | |
|---|---|---|---|
| FR | 2787825 A3 * | 6/2000 | |
| GB | 2 425 507 A | 11/2006 | |

* cited by examiner

METHOD AND APPARATUS FOR PRODUCING A UNIVERSAL PROFILE ELEMENT

FIELD OF THE INVENTION

The present invention relates to a method for producing of a profile element for sealing building joints, particularly for sealing them with regard to noise and smoke and, if applicable, with regard to fire, to an apparatus for producing such a profile element, as well as to the use of the profile element produced according to the invention for acoustical, smoke-proof and/or fire-proof sealing of connection joints in drywall walls, above all of expansion joints. In particular, the invention relates to an improved method for continuous and endless production of a universal profile element for different profile dimensions.

BACKGROUND OF THE INVENTION

Connection joints generally occur when different components make contact with one another. Connection joints are found in the connection region with the floor and with solid walls. In buildings, lowering or lifting of the ceiling can come about due to weight stress or thermal influences. In order to prevent damage to the drywall, in this case the upper connection joint is implemented as an expansion joint. Therefore, joints that interrupt components and prevent stress cracks are referred to as expansion joints. The ceiling profile is implemented in such a manner that relative movement between the ceiling profile and the perpendicular wall components is possible.

In general, a U profile, which is part of the framework, is attached to the connecting components. Usual U profiles with which the work is done are, in particular, U profiles having profile widths of 2½ inches (64 mm), 3⅝ inches (92 mm), 4 inches (102 mm), 6 inches (152 mm), 8 inches (203 mm), and 10 inches (254 mm). The gypsum boards themselves are affixed to the connecting component at a defined distance. Usually, sealing of the system takes place in the gap between the gypsum board and the ceiling. For this purpose, either a suitable sealing compound is introduced, or the gap is filled with mineral wool and provided with a sealing layer on the surface. In both cases, the material situated in the joint prevents movement relatively strongly, with the result that in order to achieve sufficient movement absorption, the work has to be done with relatively great joint widths.

Different methods for producing profile elements, such as profile strands and joint cores, for sealing building joints, particularly connection joints, with regard to noise and smoke are known from the state of the art.

DE 3038524 A1 describes an expansion joint tape that is equipped with a flexible tube, wherein the expansion joint tape is introduced into a joint between the concrete elements. The flexible tube serves to fill in additional joint material, such as polyurethane, in order to subsequently seal the joint, and this makes installation and handling more difficult.

DE 4006997 A1 describes a method and an apparatus for producing profile strands composed of fire-protection foam materials, using a reaction mixture prepared in a mixer, which mixture is filled into a closed, flexible and airtight film tube, wherein the film tube is removed before use of the profile strand.

DE 102010008570 A1 describes a method for producing a fire-protection joint cord, wherein an intumescent foam flows into a tube and is caused to foam there. Disadvantages in DE 102010008570 A1 are the predetermined diameter of the tube, as well as a backup of the material mass that might occur during the production process or insufficient material mass in the joint cord that is produced.

U.S. Pat. No. 2,898,634 describes a method for producing a foamed plastic material, particularly a material having a round geometry. Different shaping of the foamed material, for example for a specific shape of joint sealing tapes, is not possible.

The systems of the state of the art have further additional disadvantages such as, for example, significant time expenditure during production due to complicated cleaning steps of the system or due to complicated refitting, high costs, structure of the joint core or of the profile element composed of multiple components or complicated construction elements, poor ability to be cut, great weight or very inconvenient installation for building joints, particularly for connection joints.

It is therefore an object of the invention to provide a method for producing a profile element for sealing building joints, particularly for sealing them with regard to noise and smoke, and, if applicable, with regard to fire, which method avoids the disadvantages of the known methods. In particular, it is an object of the present invention to provide an improved method for continuous and endless production of such a profile element, which can be universally used for different profile dimensions in drywall construction.

It is a further object of the present invention to provide an apparatus that allows cost-advantageous, economical, continuous and endless production of such a profile element.

It is a further object of the present invention to provide use of the profile element produced according to the invention for acoustical, smoke-proof and/or fire-proof sealing of connection joints in drywall walls, above all of expansion joints.

These and other objects that are evident from the following description of the invention are accomplished by the present invention as it is described in the independent claims. The dependent claims relate to preferred embodiments.

SUMMARY OF THE INVENTION

The present invention relates to a method for producing a profile element for sealing a building joint, comprising the following steps:
a) providing a first film on a conveyor belt,
b) applying a reaction mixture capable of flow on a top side of the first film,
c) connecting a first side edge region of the first film with a second side edge region of the first film to produce an essentially cylindrical profile element, wherein the volume of the reaction mixture capable of flow to be applied is metered in such a manner that it corresponds to the inside volume of the profile element produced, in the reacted state, and wherein the film completely encloses the reaction mixture, and
d) perforating the profile element.

The present invention furthermore relates to an apparatus for producing a profile element, for sealing a building joint, having a casting system for mixing and applying a reaction mixture capable of flow, comprising
a) a first feed apparatus for supplying a first film,
b) if applicable, a roll for perforating the film,
c) at least one conveying means for laying the film flat and conveying it,
d) a shaping shoulder for shaping the first film, e) a metering system for applying a reaction mixture capable of flow,
f) a first thermal welding system for connecting a first side edge region of the first film with a second side edge region of the first film,
g) a reaction segment for allowing the reaction mixture capable of flow to foam,
h) conveying technology for precise guidance of the film,
i) if applicable, at least one conveyor belt or profile for shaping the desired profile geometry,
j) a perforation unit for venting the profile element,
k) a perforation unit for perforating the connection element, and
l) if applicable, a cutting unit for cutting the profile element to the desired length.

Furthermore, the present invention relates to use of the profile element produced according to the invention for acoustical, smoke-proof and/or fire-proof sealing of connection joints in drywall walls, above all of expansion joints.

Other objects and characteristics of this invention are obvious, in part, and are explained hereinafter, in part. In particular, the object of the present invention is described in detail, making reference to the following figures:

DETAILED DESCRIPTION OF THE INVENTION

The following terms were used within the scope of the present invention:

The term "profile geometry" within the scope of the present invention comprises different cross-section types and cross-section forms of the profile element. This means that the sealing regions of the profile elements, in particular, can have different cross-section types. Cross-section types are understood to be, among other things a round profile (round cross-section), oval profile (oval cross-section), polygonal profile (polygonal cross-section), particularly square profile (square cross-section), rectangular profile (rectangular cross-section), parallelogram profile (cross-section in the form of a parallelogram), triangular profile (triangular cross-section), etc. However, other or mixed cross-section forms are conceivable and possible, such as, for example, a rectangular profile having rounded corners. Cross-section forms are understood to be, among other things, a solid profile and a hollow profile, wherein in the case of the solid profile, the sealing regions consist entirely of sealing material, whereas in the case of the hollow profile, the sealing regions consist only partially of sealing material.

The term "deformable" within the scope of the present invention means that uneven areas in the component can be balanced out, against which areas the profile element is pressed. "Plastically deformable" means, in this regard, that the profile element is deformable and does not return to its original shape after the deformation. "Elastically deformable" means, in this regard, that the profile element is deformable and returns to its original shape after the deformation, i.e. that the material can be reversibly deformed to a certain degree.

The terms "has/have," "having," and "has/have" are supposed to be inclusive and mean that other elements aside from those mentioned can also be intended.

The term "intumescence" within the scope of the present invention means, in this regard, that the material expands under the effect of heat, for example in the event of a fire, and forms an insulating layer composed of flame-retardant material, in other words it intumesces.

Within the scope of the present invention, "foam material that burns off slowly" is understood to be a foam material that offers no possibility of spreading the fire through the foam material, is not inherently flammable, and also does not drip as it burns.

Used within the scope of the present invention, the singular forms "a" and "an" also include the corresponding plural forms, unless the context clearly permits a different conclusion. Therefore the term "a," for example, is supposed to mean "one or more" or "at least one," unless indicated otherwise.

In one aspect, the present invention relates to a method for producing a profile element for sealing a building joint, comprising the following steps:
a) providing a first film on a conveyor belt,
b) applying a reaction mixture capable of flow on a top side of the first film,
c) connecting a first side edge region of the first film with a second side edge region of the first film to produce an essentially cylindrical profile element, wherein the volume of the reaction mixture capable of flow to be applied is metered in such a manner that it corresponds to the inside volume of the profile element produced, in the reacted state, and wherein the film completely encloses the reaction mixture, and
d) perforating the profile element.

In a further aspect, the present invention relates to an apparatus for producing a profile element for sealing a building joint, having a casting system for mixing and applying a reaction mixture capable of flow, comprising
a) a first feed apparatus for supplying a first film,
b) if applicable, a roll for perforating the film,
c) at least one conveying means for laying the film flat and conveying it,
d) a shaping shoulder for shaping the first film,
e) a metering system for applying a reaction mixture capable of flow,
f) a first thermal welding system for connecting a first side edge region of the first film with a second side edge region of the first film,
g) a reaction segment for allowing the reaction mixture capable of flow to foam, h) conveying technology for precise guidance of the film,
i) if applicable, at least one conveyor belt or profile for shaping the desired profile geometry,
j) a perforation unit for venting the profile element,
k) a perforation unit for perforating the connection element, and
l) if applicable, a cutting unit for cutting the profile element to the desired length.

In yet another aspect, the present invention relates to use of the profile element produced according to the invention for acoustical, smoke-proof and/or fire-proof sealing of connection joints in drywall walls, above all of expansion joints.

Such a profile element is described in detail in PCT/EP2016/053013, which is incorporated here by making reference to it.

It has been found that the method according to the invention is particularly suitable for producing a profile element in simple, continuous, economical and cost-advantageous manner, in order to reliably seal a building joint between two components that border on one another, particularly with regard to noise and/or smoke, and, if applicable, also with regard to fire. In particular, the profile element produced according to the invention can be universally used for different profile widths, particularly of a U profile of a drywall framework. In order for the profile element to be able to fulfill its function, the connection element of the profile element must have a perforation. Furthermore, it is advantageous that the sealing regions of the profile element have a predetermined geometry.

Therefore, it is an objective of the present invention to describe the method for producing a profile element for sealing a building joint. Furthermore, it is an objective of the present invention to describe the apparatus for producing a profile element, for sealing a building joint, in detail. Furthermore, it is an objective of the present invention to describe use of the profile element produced according to the invention for acoustical, smoke-proof and/or fire-proof sealing of connection joints in drywall walls, above all of expansion joints.

Such a profile element can be produced, according to the invention, in that a suitable reaction mixture capable of flow is applied to a flat film, of which film a first side edge region is subsequently connected with a second side edge region, to produce an essentially cylindrical profile element, wherein the foaming, deformable material passes through a reaction segment, together with the film, and is formed into a profile element.

For this reason, the method according to the invention, for producing a profile element for sealing a building joint, comprises the following steps:
a) providing a first film on a conveyor belt,
b) applying a reaction mixture capable of flow on a top side of the first film,
c) connecting a first side edge region of the first film with a second side edge region of the first film to produce an essentially cylindrical profile element, wherein the volume of the reaction mixture capable of flow to be applied is metered in such a manner that it corresponds to the inside volume of the profile element produced, in the reacted state, and wherein the film completely encloses the reaction mixture, and
d) perforating the profile element.

Furthermore, the method according to the invention comprises the steps:
e) allowing the reaction mixture capable of flow to foam,
f) if applicable, shaping the desired profile geometry,
g) venting the profile element, and
h) if applicable, cutting the profile element to the desired length.

If applicable, the method according to the invention furthermore comprises the steps:
i) making a second film available,
j) connecting the second film, in the form of a loop, with the upper or lower outer side of the first film.

In a preferred embodiment of the method according to the invention, steps c) and j) comprise producing the connection by means of thermal welding.

According to the invention, in a first step of the method, making a film available takes place by means of a feed apparatus, which comprises at least one roller, by way of which the film is supplied from a film supply of a rotating roll, if applicable for perforation.

It is practical if the films provided consist of plastic. The material of the film is preferably a plastic material that does not enter into any adhesion connections with the foam system and withstands the foam pressures without an additional support mold. Alternatively, when using other films or foils, for example a paper foil or a woven fabric, foaming in the film sheath can also take place in a support mold, which determines the outer contour of the film, which expands during the foaming process.

In the method according to the invention, the film is provided preferably as a perforated film. Suitable film materials are, among other things, polymers such as, for example, silicone, polyethylene, polypropylene, polyurethane, polyvinyl chloride, rubber and/or mixtures thereof. Preferably, the film is provided as a polyethylene film. In a particularly preferred embodiment of the film, the film is a perforated polyethylene film.

Perforation of the film can take place by means of a rotating roll or other means that are suitable for producing a perforation. Preferably, perforation of the film takes place by means of a rotating roll having applied needles. Alternatively, perforation can also take place by means of punching slits or holes. Perforation allows ambient air enclosed in the film tube and reaction gases that occur during the foaming reaction of the reaction mixture capable of flow to escape, and thereby prevents gas inclusions that can cause bubble formation within the profile element or under the film. By means of perforation and thereby the possibility of gas escape, uniform shaping is ensured.

In a next step of the method according to the invention, the film is laid flat onto a conveying means, preferably a conveyor belt or belt conveyor, and passed over a shaping shoulder where the side edge regions of the film are set slightly upright, so that the reaction mixture capable of flow can be applied in a next step.

According to the invention, a deformable reaction mixture capable of flow is used in the method. In this regard, the material can be either plastically or elastically deformable. Preferably, the deformable reaction mixture capable of flow is a polyethylene mixture, a polyurethane mixture or a cellular rubber mixture. In particular, the finished profile element consists of a material that is capable of recovery after compression, such as, for example, foam material, foam rubber, cellular rubber or the like. Possible foam materials that can be mentioned are usual foam materials such as polyethylene foam material and polyurethane foam material or cellular rubber. In this regard, the foam material can be an open-cell foam material with very low air passage resistance, also an almost closed-cell foam material with extremely low air passage values. Foam materials having air passage values that lie between the two extreme cases mentioned above can also be used within the scope of the present invention. It is preferred that the reaction mixture capable of flow is a polyurethane mixture.

It has proven to be advantageous if the profile element produced according to the method according to the invention consists of a slow-burning foam material, such as, for example, cellular rubber or polyurethane foam, which is sheathed with a film. In the case of a slow-burning foam material, there is no possibility of fire spreading through the foam material. Independent ignition is excluded in the case of the aforementioned foam materials as starting materials. It is advantageous that in the event of a fire, dripping also does not take place. In a temperature range between 500° C. to 800° C., a slow-burning foam material should still possess at least 20%, at least 25%, preferably still at least 30%, between 20% to 60%, between 20% to 40%, preferably between 25% to 30% of its initial volume. Furthermore, in a temperature range between 500° C. to 800° C., a slow-burning foam material should still possess at least 10%, at least 20%, preferably still at least 30%, between 10% to 40%, between 10% to 30%, preferably between 15% to 20% of its initial mass.

Furthermore, the deformable reaction mixture capable of flow can contain corresponding additives if fire-protection properties, such as intumescence, for example, are desired. Under the effect of heat, as in the event of a fire, the material inflates and forms an insulating layer composed of material having low flammability. The formation of a voluminous insulating layer, namely an ash layer, can occur as the result of the chemical reaction of a mixture composed of corresponding compounds coordinated with one another, which react with one another under the effect of heat. Such systems are known to a person skilled in the art under the term chemical intumescence, and can be used according to the invention. Alternatively, the voluminous insulating layer can be formed by means of inflation of a single compound, which releases gases without a chemical reaction between two compounds having taken place, under the effect of heat. Such systems are known to a person skilled in the art under the term physical intumescence and can also be used according to the invention. The two systems can be used alone or together, in each instance, as a combination, according to the invention.

In a preferred embodiment of the method of the present invention, the reaction mixture capable of flow is an intumescent polyurethane mixture.

The reaction mixture capable of flow can be mixed in an upstream mixing process, for example in a system that is suitable for applying the reaction mixture capable of flow, such as a casting system.

According to the invention, application of the reaction mixture capable of flow takes place by means of uniform orthogonal metering relative to a top side of the film. In particular, it is required, in the production of the profile element according to the invention, that the reaction mixture capable of flow is metered uniformly orthogonal to the top side of the open, flat film. As a result, backup during the production process that occurs in the material mass in a tube that has already been fabricated, or insufficient material mass in the joint cord that is produced are prevented. Preferably, the volume of the reaction mixture capable of flow that is to be applied is metered in such a manner that it corresponds to the inside volume of the profile element produced, in the cured state.

The filled film is subsequently passed to a welding system, using conveying technology, where a first side edge region of the film is connected with a second side edge region of the film to produce an essentially cylindrical profile element. Preferably, the step of connecting these regions takes place by means of thermal welding, with the formation of a fish fin weld seam. In this regard, the film should completely enclose the reaction mixture.

This tubular profile element, formed in this way, is subsequently passed over a reaction segment by means of conveying technology, in which segment foaming of the reaction mixture capable of flow takes place. Preferably, foaming of the reaction mixture capable of flow takes place over a time period of 15 to 90 seconds. Foaming takes place between the thermal welding system and a perforation unit. In a particular embodiment of the method of the present invention, the conveying technology comprises a conveyor belt or a belt conveyer having guide elements, for example nubs or depressions, for precise guidance of the film.

During guidance over the reaction segment, shaping of the desired profile geometry can take place, if applicable. Preferably, the desired profile geometry can be formed by means of at least one conveyor belt or profile.

Subsequently, ventilation of the profile element takes place by means of a perforation unit, when the foam has filled the mold and the original ventilation holes have been sealed by the foam, in order to allow the reaction gases to escape and the pressure that has built up to dissipate. This ventilation prevents the film mantle from coming loose from the foam and inflating to form a tube (starting form). Ventilation can also take place by means of pricking small openings into the film, for example using a needle or needle roll, or by means of slit punching or hole punching. Preferably, perforation of the film takes place by means of a rotating roll having applied needles.

Afterward, the profile element is passed to a perforation unit for perforating the connection element of the profile element. Perforation of the connection element preferably takes place in the center of the connection element, i.e. in the longitudinal direction of the profile element. This perforation allows easy separation (tearing apart) or, alternatively, pulling apart of the two profile element halves.

In order to obtain different profile dimensions, particularly different widths of the contact region of the profile element, the connection element of the profile element according to the invention can be provided with a widening element in the form of a film loop. This loop is supplied by way of a second feed apparatus, passed over a shaping shoulder to shape the film, and connected with the upper or lower outer side of the first film by means of a second thermal welding system. Alternatively, attachment can also take place by means of sewing it on, gluing it on or. The dimension of the loop is sized in such a manner that after the two profile element halves are pulled apart by means of separation of the perforation of the connection element, the desired width for an alternative profile is formed. Thus, a second profile dimension can be obtained by means of a separation step. i.e. the profile element can simultaneously be used for a 3⅝ inch (92 mm) or a 6 inch (152 mm) rail, for example.

Furthermore, the profile element according to the invention can have one or more additional widening elements in the form of loops. These additional widening elements can be obtained in that the loop of the at least one widening element is still divided one or more times with a welding seam, so that several profile widths can be covered with one product, by means of corresponding separation of the seam or seams. In particular, the common U profiles having profile widths of 2½ inches (84 mm), 3⅝ inches (92 mm), 4 inches (102 mm), 6 inches (152 mm), 8 inches (203 mm), and 10 inches (254 mm) can be covered by means of the one or by means of the multiple widening elements. In this way, installation and, in particular, positioning of the profile element on the crosspiece of the U profile are facilitated. For facilitation of the selection of the desired width of the profile element for a specific profile, the widening elements can be provided with markings for the specific profile sizes. Because of the flexibility of the widening element, however, it is possible to also cover different profile widths of U profiles of a drywall framework with the profile element that is produced according to the invention and to seal the joint.

Furthermore, the method can also comprise the step of application of adhesive tapes or self-adhesive fixtures to the profile element, if desired.

In conclusion, the finished profile element is passed to a cutting unit, if applicable, where cutting the profile element to the desired length takes place, if continuous production is not desired.

The method according to the invention thereby allows cost-advantageous, economical, continuous and endless production of universal profile elements. The method according to the invention is preferably carried out by means of an apparatus for producing such profile elements.

Such an apparatus for producing such profile elements has a casting system for mixing and applying a reaction mixture capable of flow, and comprises
a) a first feed apparatus for supplying a first film,
b) if applicable, a roll for perforating the film,
c) at least one conveying means for laying the film flat and conveying it,
d) a shaping shoulder for shaping the first film,
e) a metering system for applying a reaction mixture capable of flow,
f) a first thermal welding system for connecting a first side edge region of the first film with a second side edge region of the first film,
g) a reaction segment for allowing the reaction mixture capable of flow to foam,
h) conveying technology for precise guidance of the film,
i) if applicable, at least one conveyor belt or profile for shaping the desired profile geometry,
j) a perforation unit for venting the profile element,
k) a perforation unit for perforating the connection element, and
l) if applicable, a cutting unit for cutting the profile element to the desired length.

Preferably, the feed apparatus for supplying the film comprises at least one roller. Further preferably, the conveying technology for precise guidance of the film comprises a conveyor belt or belt conveyor having guide elements, for example nubs or depressions. Preferably, the conveyor belt or profile for shaping the desired profile geometry can be given any desired shape, or any desired shape can be produced by the conveyor belt or profile, and thereby the profile geometry of the profile element can be predetermined.

Furthermore, the apparatus can comprise a second feed apparatus for supplying a second film, a shaping shoulder for shaping the second film, and a second thermal welding system for connecting the second film with the upper or lower outer side of the first film. This allows providing the profile element with a widening element.

Furthermore, the apparatus can comprise an unrolling apparatus for applying adhesive tapes to the profile element. Two separate profile element halves can then be easily produced without the use of a tool, which halves both possess a sealing region and can be used for one-sided sealing or for wider U profiles, with the aid of the adhesive tapes, particularly U profiles having profile widths of more than 10 inches (254 mm).

A particular embodiment of the profile element produced according to the invention, for sealing a joint between a first component and a second component, is of particular practical significance, wherein the profile element comprises an elongated connection element and at least two sealing regions, which are positioned on the connection element, on the outer edge, spaced apart from and next to one another, running in the longitudinal direction of the connection element. Preferably, the profile element produced according to the invention is used for acoustical, smoke-proof and/or fire-proof sealing of connection joints in drywall walls. In this regard, it is particularly preferred that the profile element is positioned in the upper region of the connection joint and configured for sealing the joint from the outside.

Such a profile element is described in detail in PCT/EP2016/053013, which is incorporated here by making reference to it.

Preferred cross-section shapes of the sealing regions of the profile element produced according to the invention are round profile and polygonal profile, particularly rectangular profile, square profile, oval profile, parallelogram profile, triangular profile, and rectangular profile having rounded corners. A rectangular profile having rounded corners is particularly preferred. However, other or mixed profile geometries are also conceivable and possible, as long as the sealing regions border on the two components after installation of the profile element and can close the joint that exists between the components.

The dimension and profile geometry as well as the materials of the profile element produced according to the invention are selected in accordance with the planned use of the profile element and can easily be implemented by means of the method according to the invention.

In general, the dimension of the profile element produced according to the invention is selected as a function of the profiles used and of the material used. The dimension must be selected in such a way that the profile element fills the gap between the gypsum board and the ceiling and lies against both the ceiling and the gypsum board, forming a seal. If vertical movement of the gypsum boards is supposed to be permitted, the profile element, particularly the sealing regions, must follow the movement of the gypsum board, so that contact with the gypsum board is not interrupted and no gap can occur between sealing region and gypsum board. For this purpose, the profile element produced according to the invention consists of material that can recover its shape and be compressed, such as polyurethane foam, and is correspondingly pre-compressed during installation of the gypsum boards, so that a downward movement of the gypsum board, increasing the gap between it and the ceiling, can be followed. The pre-set freedom of movement of the gypsum board therefore determines the dimension of the profile element.

The region of the connection element that lies between the two sealing regions, more precisely between the points of attack of the connection element on the sealing region, defines a contact region that consists only of the connection element. In this regard, the contact region is dimensioned in such a manner that it approximately corresponds to the width of the crosspiece of the U profile. In this way, installation and, in particular, positioning of the profile element on the crosspiece of the U profile are facilitated. It is preferred that the contact region of the profile element according to the invention has a width of about 30 mm to about 300 mm, preferably in the range of about 50 to 250 mm, and more preferably in the range of about 90 to 155 mm. It is particularly preferred that the contact region of the profile element produced according to the invention has a width of 67 mm for a 2½ inch (64 mm) rail, of 95 mm for a 3⅝ inch (92 mm) rail, of 105 mm for a 4 inch (102 mm) rail, of 155 mm for a 6 inch (152 mm) rail, of 206 mm for an 8 inch (203 mm) rail, and of 257 mm for a 10 inch (254 mm) rail. It is most preferred that the contact region of the profile element produced according to the invention has a width of 95 mm for a 3⅝ inch (92 mm) rail and of 155 mm for a 6 inch (152 mm) rail.

Positioning of the profile element produced according to the invention on a component can take place in one step. It is also possible that the profile element in turn has means for attachment to a component, for example in the form of a self-adhesive layer, in the form of means that act with shape fit or force fit, such as suitable profilings, or the like. The profile element produced according to the invention is preferably positioned on a component in one step.

Use of a profile element produced according to the invention comprises positioning on a first component before affixation of the first component, and then joint attachment with this component on a second component, in usual manner, for example by screwing or nailing it on. Preferably, the first component is a frame profile of a drywall framework, for example a U profile, and the second component is a wall, a ceiling or a floor of a building. Particularly preferably, the first component is a U profile, and the second component is a ceiling. With this arrangement, the profile element is positioned in the outer region of the joint, particularly the connection joint, and configured for sealing the joint from the outside.

When using the profile element produced according to the invention on the U profile and abutting the ceiling, uneven regions in both components can be balanced out, and simple positioning without gluing is possible. Furthermore, the joint distance can be controlled by means of the subsequent positioning of the gypsum board as well as by means of the selection of the sealing material and/or geometrical configuration of the profile element.

The profile element produced according to the invention can be used on all types of connection joints in which a component meets another component. Accordingly, the profile element can be used for all profiles, including closed profiles or wooden beams, which must be sealed with regard to a connecting surface.

A particularly preferred use of the profile element produced according to the invention therefore relates to sealing the profiles in drywall construction, wherein the first component is a ceiling profile, floor profile or wall profile or a metal or wood framework of a drywall element, and the second component is a floor, a ceiling or a wall of a component, for example a masonry construction or concrete component. The profile can be any one of the profiles for drywall construction that are usually used, independent of whether it has a slit or non-slit crosspiece or a slit or non-slit flange. The further components are gypsum boards that lie tightly against the profiles and are attached to the framework. In order to permit vertical movement of the gypsum boards, for example in the event of an earthquake, the gypsum boards are installed at a distance from a wall, a floor or a ceiling, with vertical mobility. In this way, a gap occurs (also called a joint herein) between the gypsum board and the wall, the floor or the ceiling. This joint is filled by the profile element, so that the profile element seals the joint with regard to noise and/or smoke, and, depending on the material, if applicable also with regard to fire.

Without restricting the scope of protection of the invention, the invention will be described in greater detail using the production of a profile element according to the invention by means of an apparatus that is shown schematically in FIG. 1.

Figure 1:
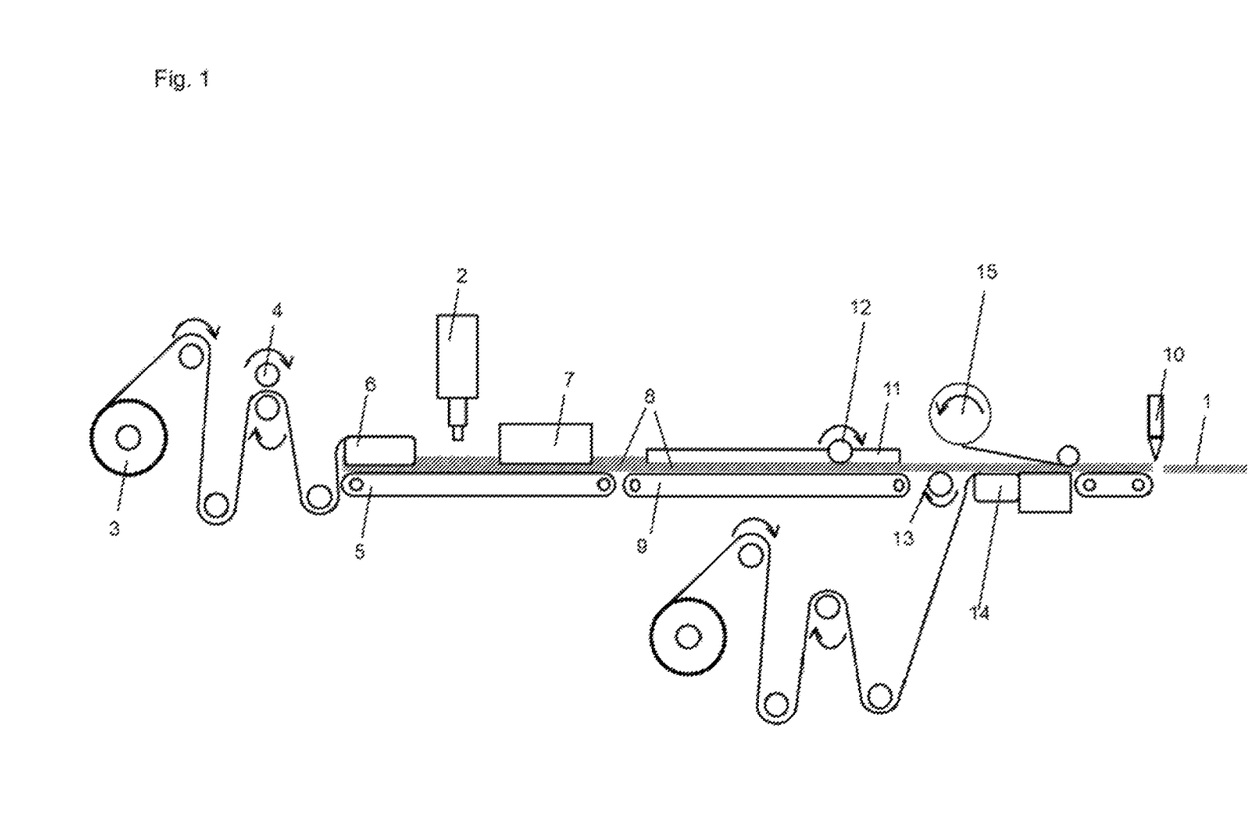
FIG. 1 schematically shows an embodiment of the apparatus according to the invention for producing a profile element.

In the case of the apparatus for production of a profile element 1 shown in FIG. 1, a polyethylene film is passed from a film supply 3, by means of a feed apparatus, over at least one roll 4, where perforation takes place, if applicable. Perforation is carried out by means of a rotating roll 4 having applied needles. The film is then laid flat onto a conveying means 5 and passed over a shaping shoulder 6, where the side edge regions of the film are set upright (shaping of the first film), in order to apply an intumescent polyurethane material capable of flow. The polyurethane material capable of flow is mixed by means of a casting system 2 and applied to the film by means of uniform orthogonal metering relative to the top side of the film. The film is subsequently passed to a thermal welding system 7, using conveying means 5, where a first side region of the film is connected with a second side edge region of the film by means of thermal welding, with the formation of a fish fin weld seam. Conveying means 5 can also be integrated into the thermal welding system 7. This tubular profile element 1, which has been produced in this way, is subsequently passed over a reaction segment 8 by means of conveying technology 9, in which segment foam of the polyurethane material takes place. The desired profile geometry is formed by means of at least one conveyor belt or profile 11. Subsequently, ventilation of the profile element 1 takes place by means of a perforation unit 12, for example a needle roll, when the foam has filled the mold. Afterward, the profile element 1 is passed to a perforation unit 13 for perforation of the connection element of the profile element. If applicable, the profile element 1 is then provided with a widening element in the form of a film loop, which is supplied by way of a second feed apparatus, passed over a shaping shoulder to shape the film, and connected with the upper or lower outer side of the first film by means of a second thermal welding system 14. If applicable, adhesive tapes can be applied using the unrolling apparatus 15. Subsequently, the finished profile element 1 is passed to a cutting unit 10, where cutting of the profile element 1 to the desired length takes place, if applicable.

Figure 2A:
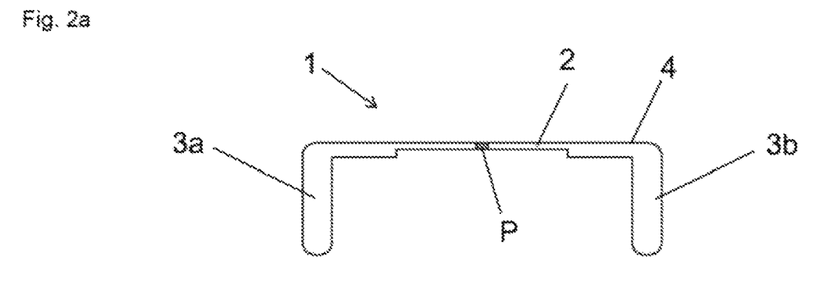
FIG. 2a shows a schematic front view of an embodiment of a profile element produced according to the invention, wherein the sealing regions have a solid profile and a rectangular profile having rounded corners, and the connection element has a perforation.
Figure 2B:
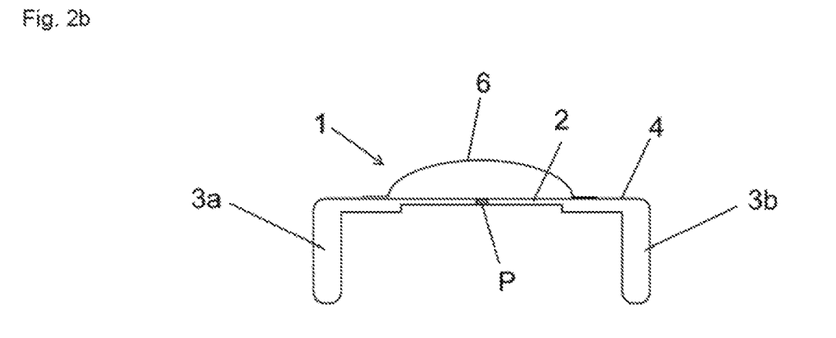
FIG. 2b shows a schematic front view of an embodiment of a profile element produced according to the invention, wherein the sealing regions have a solid profile and a rectangular profile having rounded corners, the connection element has a perforation and a widening element.
Figure 2C:
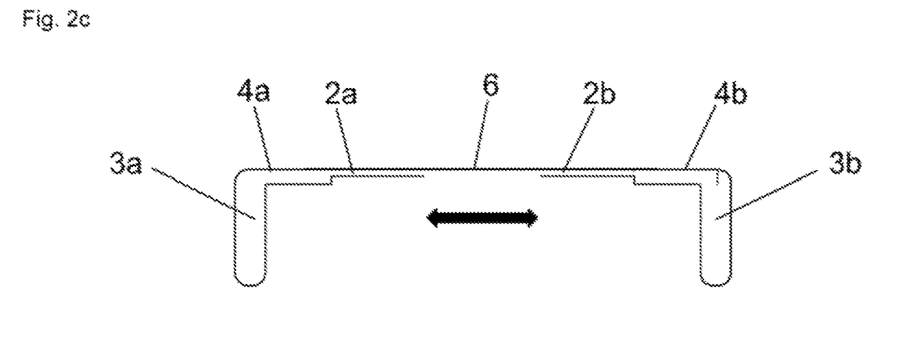
FIG. 2c shows a schematic front view of an embodiment of a pulled-apart profile element produced according to the invention, wherein the sealing regions have a solid profile and a rectangular profile having rounded corners, and wherein the widening element connects the two separated profile element halves.

In FIGS. 2a to 2c, a preferred embodiment of a profile element 1 produced according to the invention is shown. The profile element 1 has two sealing regions 3a and 3b, which are positioned on the outer edges of the connection element 2. The sealing regions 3a and 3b have a rectangular profile having rounded corners and a solid profile. The sealing regions 3a and 3b and the connection element 2 consist of a compressible polyurethane foam material that contains fire protection additives, if applicable. The polyethylene film 4 encloses the polyurethane foam material completely. The connection element 2 has a perforation (P) in the longitudinal direction of the profile element 1, and, if applicable, a widening element 6 composed of a plastic film (FIG. 2b), which is attached to the top side of the connection element 2. FIG. 2c shows the profile element 1 from FIG. 3a, separated at the perforation, wherein the two profile element halves both have a sealing region 3a, 3b, both have a part 2a, 2b of the connection element 2, and both are partially sheathed with plastic film 4a, 4b, and wherein the widening element 6 connects the two separated profile element tape halves.

Figure 3:
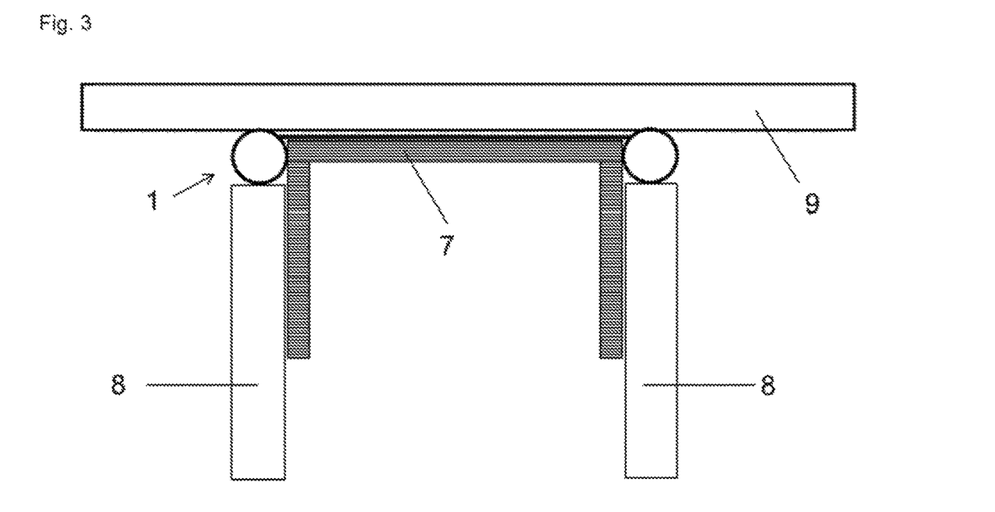
FIG. 3 shows the use of an embodiment of a profile element produced according to the invention for acoustical, smoke-proof and/or fire-proof sealing of connection joints in drywall walls.

FIG. 3 schematically shows the use of an embodiment of a profile element produced according to the invention I for acoustical, smoke-proof and/or fire-proof sealing of connection joints in drywall walls, wherein the sealing regions have a round profile and a solid profile. To seal the gap between a ceiling 9, the U profile 7 of a drywall framework, and the gypsum boards 8, in a first step the profile element 1 is laid onto the crosspiece of the U profile 7, and, together with it, attached to the ceiling 9 in usual manner, for example by screwing or nailing it on, in a second step. Then, in a last step, the gypsum boards 8 are laid against the flanges of the U profile 7, pushed upward in the direction of the ceiling 9, wherein a gap remains between the top edge of the gypsum board 8 and the ceiling 9, which gap is filled with the sealing regions 3a and 3b of the profile element 1, in order to permit vertical movement of the gypsum board 8, for example. In this way, the sealing regions 3a and 3b are compressed and thereby seal the gap between the ceiling 9 and the U profile 7 and the gap between the ceiling 9 and the gypsum board 8. Positioning of the gypsum board is also possible on the sealing region of the profile element. The profile element 1 is therefore positioned in the upper region of the connection joint and configured for sealing the joint from the outside.

As is evident from what has been explained above, the method according to the invention is particularly suitable for producing a profile element for acoustical, smoke-proof and/or fire-proof sealing of connection joints in drywall walls, above all of expansion joints, in cost-advantageous, economical, continuous and endless manner.

The method according to the invention and the apparatus according to the invention are particularly characterized by the following advantages as compared with systems of the state of the art:

Because of the uniform orthogonal metering relative to the surface of the film, no contamination of possible process feed lines takes place, because the foam only comes into contact with the film and not with further components of the apparatus. Furthermore, the apparatus allows rapid refitting to other dimensions and diameters of the desired profile element, for example by replacing the shaping shoulder and adjusting the film width as well as the desired length of the profile element, without complicated refitting. The method and the apparatus according to the invention allow the production of profile elements for different profile widths of a U profile of a drywall framework, particularly for the usual profile widths of 2½ inches (64 mm), 3⅝ inches (92 mm), 4 inches (102 mm), 6 inches (152 mm), 8 inches (203 mm), and 10 inches (254 mm). By means of the profile element produced according to the invention, a universal product is made available for different profile sizes and applications, which product can furthermore be produced cost-advantageously in a production line.

By means of the flexible use of multiple conveyor belts or profiles, free geometrical configuration of the profile, depending on the desired area of use, can take place. The film of the profile element produced according to the invention simultaneously serves as an installation aid, i.e. no further installation aids are necessary, and it is not removed before use. This furthermore has the advantage that the profile element can be installed quickly, and that the foam is protected from splashing water and during introduction.

Furthermore, the method and the apparatus according to the invention prevent backup of the material mass from occurring in a tube that has already been prefabricated, during the production process, or prevent insufficient material mass in the joint cord that has been produced. Furthermore, the mixing quality/homogeneity of the foam is also not influenced by the shaping.

As is evident from what has been explained above, the profile element produced according to the invention is particularly suitable for reliably sealing a building joint between two components that border on one another, in simple manner, particularly with regard to noise and/or smoke and, if applicable, also with regard to fire.

Furthermore, this method of installation is very easy to use, because no additional attachment of the profile element, for example to the profile or to the ceiling is required. Application of the profile element to a profile, for example, with precise fit, is also not necessary due to the self-centering of the profile element that occurs during installation of the profile on a component. Installation is therefore as easy as can be imagined, and the work effort for installation of the profile element is dearly reduced. Therefore, secure and reliable sealing of joints between two components, particularly between a profile of a drywall framework and a component that borders on it, such as a ceiling, wall or floor, is achieved by using the profile element produced according to the invention. In this regard, sealing on both sides can be achieved in a single work step, in that a prefabricated profile element is provided.

Furthermore, it has been shown that excellent sealing can be achieved with the profile element produced according to the invention, because good compressibility of the sealing regions is guaranteed by the selection of the sealing materials and/or the geometrical configuration, without any additional aids. The profile elements produced according to the invention also allow setting the correct distance from the gypsum board to the connecting component, without additional aids, in order to achieve the aforementioned precompression, by means of a suitable selection of the sealing materials and/or the geometrical configuration.

With the profile element produced according to the invention, it can also be ensured that sufficient material is installed to guarantee excellent sealing with maximal expansion absorption, and that this is already accomplished by the selection of the sealing materials and/or geometrical configuration.

Furthermore, with the profile element produced according to the invention, uneven areas of a component surface can already be securely sealed off when a component is placed against another component, because the sealing regions of the profile element are pressed against the surface of the one component in sufficiently firm manner and, at the same time, pressed against the side surface of the other component.

In view of the above, it is evident that the objects of the invention are accomplished. Because various modifications of the method, the apparatus, the profile element produced according to the invention, and its use, as described above can be made without deviating from the scope of the invention, the intention is that all the objects contained in the above description are interpreted as illustrations and not in a restrictive sense.

The invention claimed is:

1. A method for producing a profile element for sealing a building joint, comprising:
  a) providing a first film on a conveyor belt,
  b) applying a reaction mixture capable of flow on a top side of the first film, wherein the reaction mixture comprises an intumescent material,
  c) connecting a first side edge region of the first film with a second side edge region of the first film to produce an essentially cylindrical profile element and thereby obtaining a connection element, wherein a volume of the reaction mixture capable of flow to be applied is metered in such a manner that the reaction mixture corresponds to an inside volume of the profile element produced, in the reacted state, and wherein the film completely encloses the reaction mixture, d) perforating the profile element, wherein perforating the profile element comprises perforating the connection element, thereby forming a perforated region capable of separation, tearing apart, or pulling apart of the first side edge region and the second side edge region.

2. The method according to claim 1, further comprising:
e) allowing the reaction mixture capable of flow to foam,
f) optionally, shaping the desired profile geometry,
g) venting the profile element, and
h) optionally, cutting the profile element to the desired length.

3. The method according to claim 1, further comprising:
e) making a second film available,
f) connecting the second film, in the form of a loop, with an upper outer side or a lower outer side of the first film.

4. The method according to claim 3, wherein c) and f) comprise a connecting process by thermal welding.

5. The method according to claim 3, wherein the first film and/or the second film comprise(s) plastic.

6. The method according to claim 1, wherein the first film comprises polyethylene and is optionally perforated.

7. The method according to claim 1, wherein the reaction mixture capable of flow is a polyurethane mixture.

8. The method according to claim 1, wherein the profile element comprises an elongated connection element and at least two sealing regions, which are positioned on the connection element, on the outer edge, running at a distance from and next to one another in the longitudinal direction of the connection element.

9. The method according to claim 1, wherein the method is a continuous and endless method.

10. A profile element produced according to the method according to claim 1.

11. An acoustical, smoke-proof and/or fire-proof sealing, comprising the profile element of claim 10; wherein said sealing is of a connection joint in a drywall wall.

12. The acoustical, smoke-proof and/or fire-proof sealing according to claim 11, wherein the profile element is positioned in the upper region of the connection joint and configured for externally sealing the joint.

13. The method according to claim 1, further comprising:
replacing the shaping shoulder with another shaping shoulder with a different shape to form another profile element having a different shape or size.

14. An apparatus for producing a profile element, for sealing a building joint, having a casting system for mixing and applying a reaction mixture capable of flow, comprising
a) a first feed apparatus for supplying a first film,
b) optionally, a roll for perforating the first film,
c) at least one conveyor for laying the first film flat and conveying the first film,
d) a shaping shoulder for shaping the first film,
e) a metering system for applying a reaction mixture capable of flow,
f) a first thermal welding system for connecting a first side edge region of the first film with a second side edge region of the first film, thereby obtaining a connecting element,
g) a reaction segment for allowing the reaction mixture capable of flow to foam,
h) conveying technology for precise guidance of the first film,
i) optionally, at least one conveyor belt or profile for shaping the desired profile geometry,
j) a perforation unit for venting the profile element,
k) a perforation unit for perforating the connection element, thereby forming a perforated region capable of separation, tearing apart, or pulling apart of the first side edge region and the second side edge region, and
l) optionally, a cutting unit for cutting the profile element to the desired length.

15. The apparatus according to claim 14, further comprising
m) a second feed apparatus for supplying a second film,
n) a shaping shoulder for shaping the second film, and
o) a second thermal welding system for connecting the second film with an upper outer side or a lower outer side of the first film.

16. The apparatus according to claim 14, further comprising an unrolling apparatus for applying adhesive tapes to the profile element.

17. The apparatus according to claim 15, wherein at least one of the first feed apparatus and the second feed apparatus comprises at least one roll.

18. The apparatus according to claim 14, wherein a conveying technology for precise guidance of the first film comprises a conveyor belt having guide elements.

* * * * *